July 14, 1953  G. W. REHFELD  2,645,088
CONNECTOR FOR JETTY UNITS
Filed Feb. 3, 1950  3 Sheets-Sheet 1

Inventor
George W. Rehfeld
By Fishburn & Mullendore
Attorneys

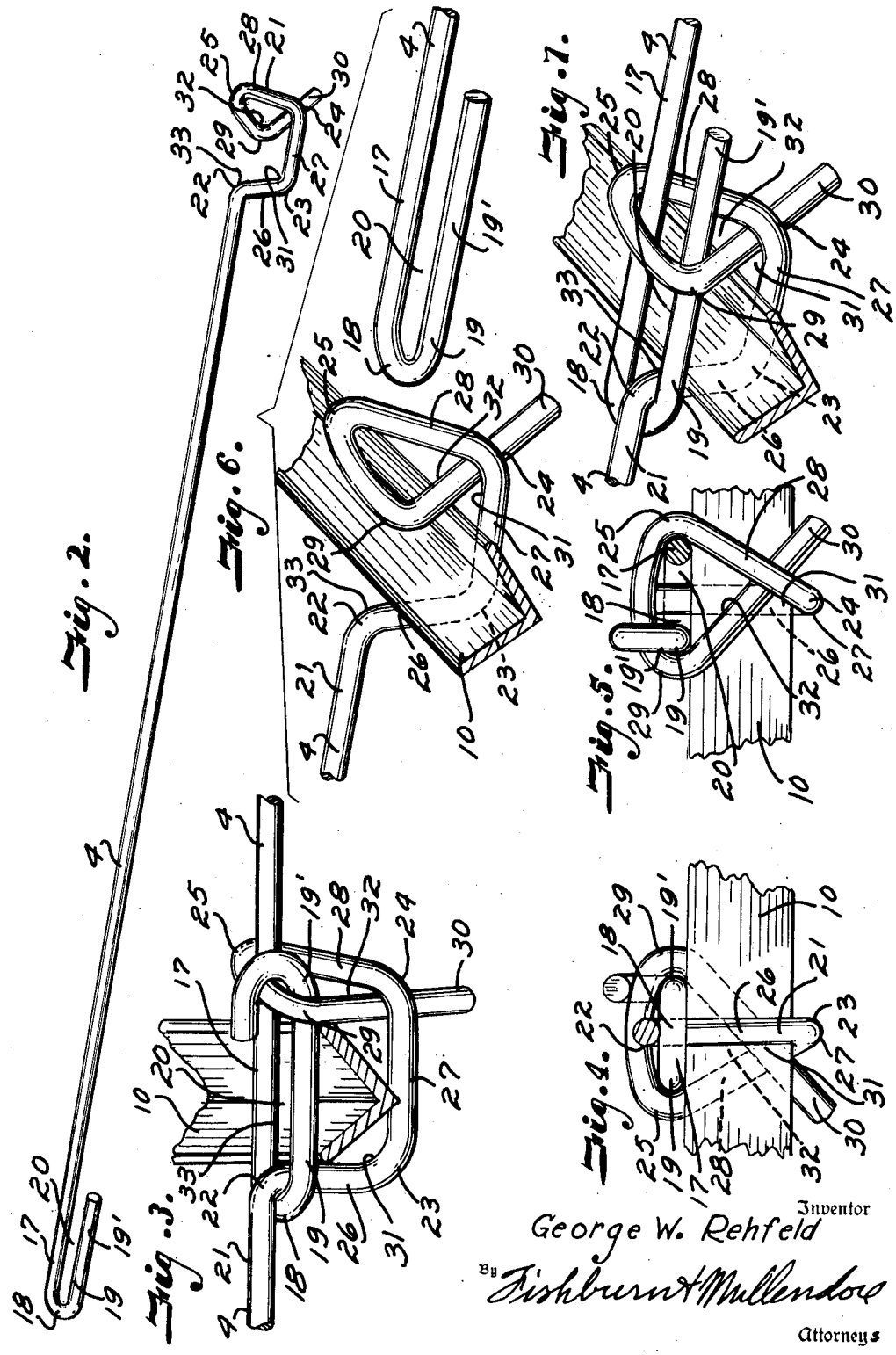

July 14, 1953
G. W. REHFELD
2,645,088
CONNECTOR FOR JETTY UNITS
Filed Feb. 3, 1950
3 Sheets-Sheet 3
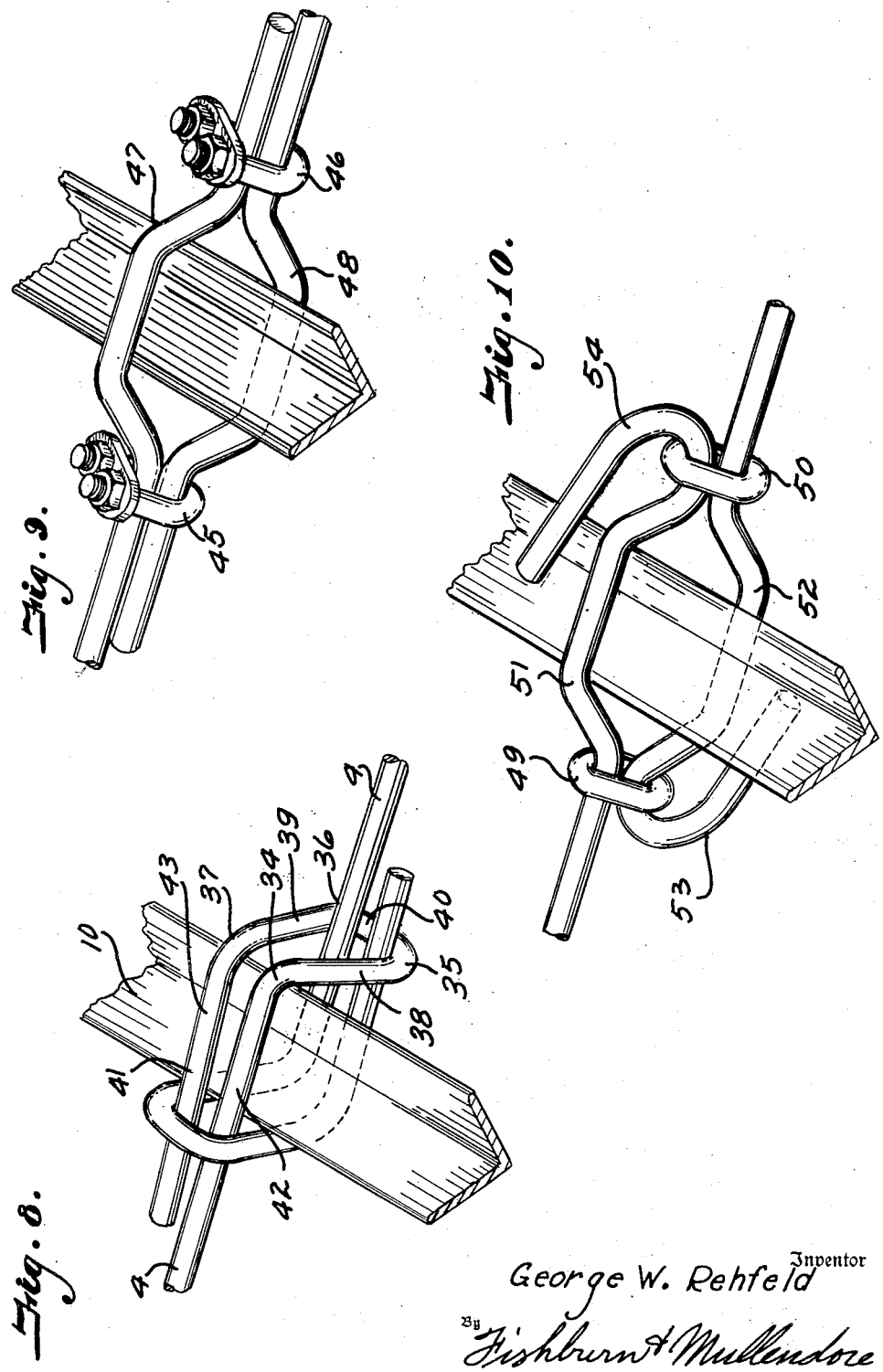
Inventor
George W. Rehfeld
By
Fishburn & Mullendore
Attorneys Patented July 14, 1953

2,645,088

UNITED STATES PATENT OFFICE 2,645,088

CONNECTOR FOR JETTY UNITS

George W. Rehfeld, Manhattan, Kans.

Application February 3, 1950, Serial No. 142,298

6 Claims. (Cl. 61—4)

1

This invention relates to jetties and more particularly to means for connecting a plurality of jetties one to the other and anchoring them along the bank of a stream for controlling and preventing erosion during times of high water.

The present practice of installing such jetties is to erect them at the site and move them into their permanent position after which the connecting lines, usually a pair of stranded cables, are threaded through the jetties from off reels located near a point of anchorage. After the cables are run off the reels the ends are secured to a dead man or other anchoring means and the jetties are fixed to the cables. When it is considered that as many as 150 jetties are connected on a single pair of cables, it is obvious that considerable time and labor is required to complete the installation. Consequently there is a long period when the jetties are unsecured and subject to the hazards resulting from sudden rises in the river. The jetties being unattached are easily disarranged by the buffeting of the currents and are carried downstream where they stack up in the mud and debris. In most cases they cannot be recovered and they often cause division of the stream, doing damage.

The small wires composing the cables are subject to attack by chemicals in the water and by other elements with the result that the cables are of short life and are constantly subject to breakage during times of high water. Another disadvantage is that new cables are expensive and difficult to obtain on the present market so that used oil field cables are substituted with the result that the cables are a hazard from the time they are installed.

Therefore the principal objects of the invention, are to provide improved connectors between the respective jetties which are quicker to install and with considerable less labor; to provide connectors by which the jetties may be intercoupled as each individual jetty is moved into position, thereby avoiding the hazards of high waters to partially completed jobs; to provide connectors that are less subject to the ill effects of the elements and which have longer life; to provide connectors that automatically space the jetties; to provide connectors in the form of individual rods which have coupling means which also form the connections with the jetties; to provide coupling means which are secure from possibility of disengagement under the buffeting of the currents and load of debris that lodge there against; and to provide the rods with integral couplings that are readily formed at the job site.

2

In accomplishing these and other objects of the invention, as hereinafter described, I have provided improved structure, the preferred form of which is illustrated in the accompanying drawings wherein:

Fig. 2 is a perspective view of one of the connecting rods particularly illustrating the couplings at the ends thereof.

Fig. 3 is a side elevational view of the interengaged couplings at the ends of the rods.

Fig. 4 is a cross section through one rod and showing the coupling in end elevation.

Fig. 5 is a similar section through the interconnected rod and showing the opposite end of the coupling.

Fig. 6 is a perspective view of the couplings at the ends of adjacent rods before they are interengaged with each other.

Fig. 7 is a similar view after the ends of the rods have been connected together and prior to bending of the locking terminal on one of the rods.

Fig. 8 is a perspective view of a modified form of coupling.

Fig. 9 is a perspective view of a further modified form of the invention.

Fig. 10 is a perspective view of a still further modified form of the invention.

Figure 1:
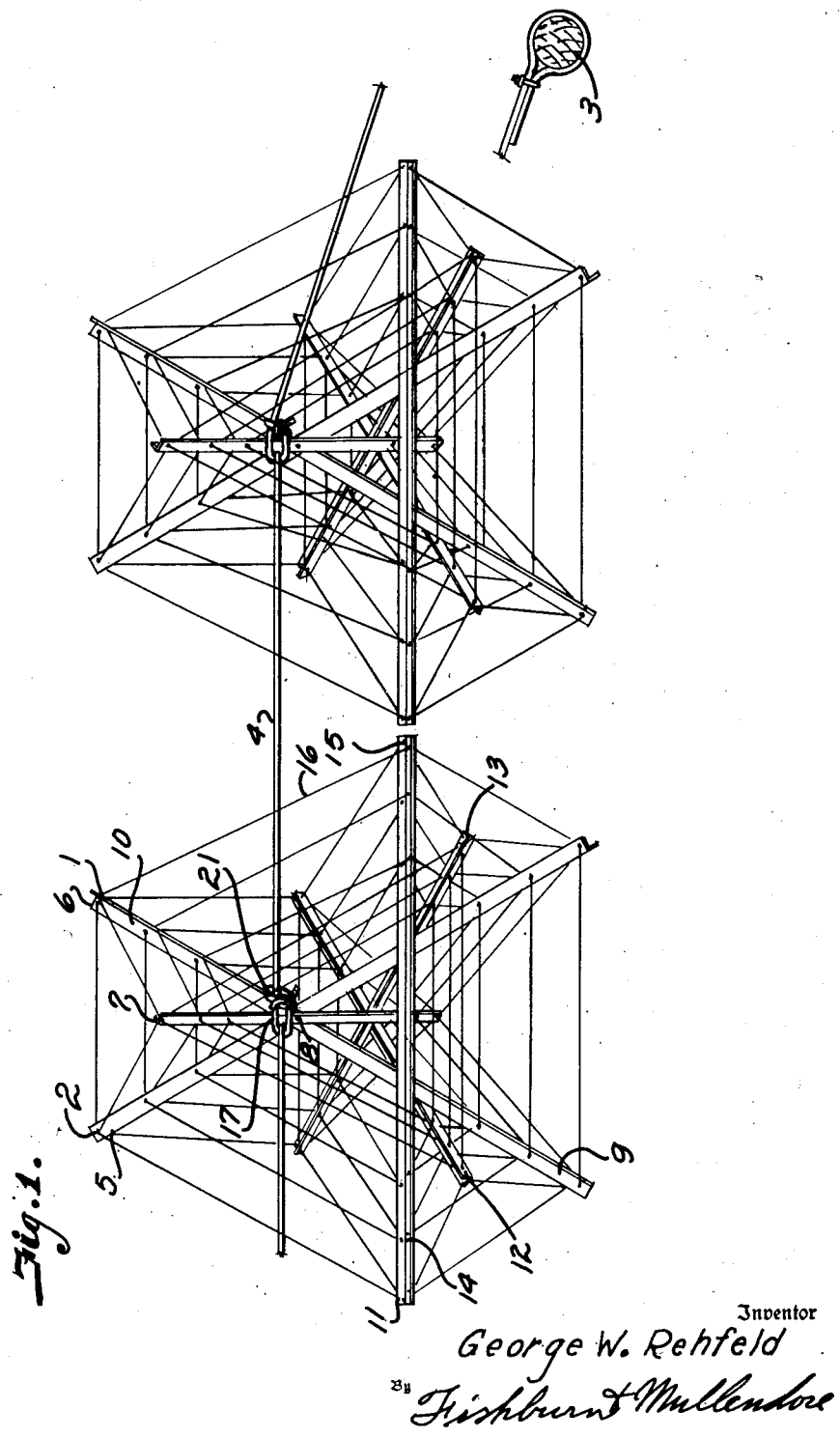
Fig. 1 is a perspective view of a line of jetties connected together in accordance with the present invention.

Referring more in detail to the drawings and first to the form of invention illustrated in Figures 1 to 7 inclusive;

1 designates a line of open frame jetties 2 that are anchored to a dead man 3 and interconnected by rods 4. In the illustrated instance the jetties are composed of angles connected together to provide a frame-work for carrying lacing for forming the obstruction necessary to retard flow of high waters and effect depositing of silt and other debris and prevent erosion along the bank of a river. The angles may be connected together in any suitable arrangement but in the illustrated instance certain of the angles designated 5, 6 and 7 are connected together in crossing relation by means of fastening devices such as bolts or the like 8 to provide substantially widely splayed legs 9 for supporting the jetty on the ground and upwardly diverging arms 10. The leg portions 9 of the jetty are also interconnected by transversely arranged angles 11, 12 and 13 of sufficient length to provide projecting arms 14, the leg and arm portions being provided with suitable apertures 15 for receiving lacing designated 16 as in conventional practice.

As above stated such jetties are usually assembled and laced at the site so that the individual units may be moved into their desired location along a river bank and subsequently connected together in such a manner that the jetties are anchored to a dead man 3 or other anchoring means that is located upon or in the river bank. Prior to the present invention, the connecting or anchoring lines were not run until all of the jetties have been completely assembled and in place. When it is considered that as many as 150 jetties might be connected with two lines, it is obvious that a considerable time elapses, perhaps several days, before the jetty units can be interconnected to each other and anchored against displacement. Consequently the contractor is in constant fear of losing the unanchored jetties because of sudden torrents and high waters which may arise without warning. When this occurs the unanchored jetties wash down the stream and are apt to lodge in a place from where they are difficult to remove and in fact they may become completely lost within the quicksand of a stream or cause serious diversion of the stream where they pile up and are mudded in with the floating debris.

The present invention avoids this difficulty through the provision of individual connectors between the respective jetty units so that when the first unit is moved into position it is directly anchored to the dead man 3 or other anchoring means and as each succeeding unit is erected and moved into position, it is interconnected with the previously assembled and anchored units. Therefore, the installed units are always anchored in position and are unaffected by sudden rises in the river which would cause a loss of the units as above described. Thus when a day's work is completed, or work is stopped, there is little possibility that the installed units will be lost during the night or the time that the workmen are off duty.

In carrying out the present invention, the connecting means between each jetty comprises a rod such as an ordinary round rod or reinforcing rods, preferably of structural grade. Such rods have substantially high tensile strength, are readily bent to form the end couplings and are highly resistant to the corrosive effects of the river water and other elements so that they are long lasting. They may also be readily obtained in sizes to adequately support the load to which they are subjected, and in lengths whereby a single rod may be used in connecting the adjacent jetty units. This is an important feature since the rods may be cut to desired length and the ends readily formed at the job site to provide the required couplings whereby the end of one rod is connected within an adjacent rod in such manner that it also forms a connection with the jetty unit.

In the form of the invention illustrated in Figs. 1–7 inclusive, the upstream end 17 of each rod is provided with a reverse bend 18 to provide a hook portion 19 extending parallel with the body of the rod and spaced therefrom to provide a slot 20 therebetween as best shown in Fig. 6. The down stream end 21 of each rod is provided with substantially lateral bends 22, 23, 24 and 25 that are spaced apart to provide leg and bar portions 26 and 27 located in plane with the body portion of the rod and which connects with a leg portion 28 formed between the bends 24 and 25, the bend 24 being arranged to offset the bend 25 to pass the body portion of an adjacent rod whereby the longitudinal pull thereon is substantially coextensive with the body portions of the rods as best shown in Fig. 5. Spaced from the bend 25 is a reverse bend 29 providing a terminal 30 extending through an open sided loop 31 formed between the leg and portions. It is obvious that a substantially triangular shaped eye 32 is provided at one end of the loop to pass the hook like end 19 of the up stream end of an adjacent rod as shown in Fig. 7, when the hook like end is engaged with the leg portion 26 for interconnecting the adjacent rods and close the open side 33 of the loop portion 31.

The open side loop is adapted to retain a part of the jetty unit therein as for example one of the upstanding arms 10 or other portion of the jetty unit. It is obvious that when the rods are connected together in the form of a chain they also form a connection and automatic spacing for the jetty units. In this manner the jetty units when placed are always connected to the anchor and the work may be stopped at any point without subjecting the jetties to the above noted hazards.

In using the connectors just described one of the rods is attached to the dead man 3, or other anchoring means and the open loop shaped end thereof is directed to receive and engage a part of the first jetty unit for example as shown in Fig. 6. The hook like end of an adjacent rod is then passed through the eye 32 and moved retractably until the terminal end of the hook passes the leg portion 26. The hook is then drawn forwardly to engage the reverse bend portion of the hook with the leg portion 26 and to bring the terminal 19' of the hook 19 through the eye 32 as shown in Fig. 7. This may complete the assembly, however to insure positive locking of the rods together, the projecting terminal 19' of the hook is bent retractively over the eye 32 as shown in Fig. 3. When the rods are thus engaged, longitudinal pull on the rods is substantially coaxial, however any tendency of the hook end of one of the rods to straighten out, due to the slightly offset relation of the respective rods, is resisted by the terminal of the hook passing through the eye 32. Likewise any tendency for the eye to straighten out is resisted by the terminal 30 thereof engaging the bar portion 27 of the loop end of the adjacent rod. After the terminal 19' of the hook is bent retractively over the eye the connection is locked in all directions so that it is impossible to disengage the ends of the rods under normal stresses and strains to which the jetties are subjected. After placement and connection of one jetty unit, the succeeding jetty units are placed and connected with the rods as just described. It is thus obvious that the placed jetties are at all times connected with the rods and anchoring means.

In the form of the invention shown in Fig. 8, the respective ends of the rods are formed with symmertical complementary couplings. In this form of the invention, each end of the rod is provided with lateral bends 34, 35, 36 and 37 to provide laterally spaced leg portions 38 and 39 connected by a bar portion 40 to space terminals 41 from the body portion of the rods. The bends are spaced to provide leg portions 42 and 43 that are of sufficient length to pass the coupling ends over a part of the unit to be connected. In making the connection with this form of the invention the loops are interengaged and the rods shifted to draw the loop up around the part of the jetty. One or more of the projecting terminals 44 may be turned retractively over the wire portion of the upper loop in the same manner as the locking terminal shown in Fig. 3.

In the form of the invention shown in Fig. 9, the rods may be straight from one end to the other and ends overlapped about a part of the jetty unit as illustrated. The ends are then drawn together by sliding U clamps 45 and 46 over the overlapped ends on the respective sides of the jetty part. The clamps 45 and 46 are then driven up toward the sides of the jetty part to form the loop portions 47 and 48 in the respective rods and bring the end of one rod in juxtaposition with the end of the other rod, after which the clamps may be retightened to assure the rods against slipping. The form of the invention illustrated in Fig. 10 is similar to that illustrated in Fig. 9, with the exception that rings or links 49 and 50 are slipped over the ends of the rods and driven toward the jetty part to form the loop portions 51 and 52. After the links have been tightened to effect deformation of the rods about the jetty part, the projecting ends 53 and 54 of the rods may be bent retractively about the loops as shown. If desired the ends of the rods shown in Fig. 9 may be turned back against the clamps in the manner disclosed in connection with the form of the invention disclosed in Fig. 10.

From the foregoing it is obvious that I have provided means for anchoring and connecting one jetty unit to the next so that the jetty units may be connected directly upon placement thereof, thereby avoiding possible loss of the jetty units as in the instance of a sudden rise in the flow of the river. It is also obvious that I have provided connections between the respective jetties which are less subject to corrosion by chemicals contained in the river waters or other elements which soon destroy the small strands of a stranded cable. It is also obvious that the sections of rods are easier to place and are more readily connected with considerable less labor than is required to thread the customary cables. It is also obvious that the rods constructed and assembled as described uniformly space the jetties and assure positive anchorage thereof in proper position within the line of jetties.

What I claim and desire to secure by Letters Patent is:

1. A connector for interconnecting jetty units including rods, each having open side loops on one end adapted to engage parts of the jetty units therein and having a terminal loop forming an eye, hooks on opposite ends of said rods adapted to pass through said eyes of the next adjacent rods and closing relation with the open side of said loops and in hooked engagement with sides of the loops opposite said eyes, said hook ends of said rods having projecting terminals adapted to be bent retractively over said eyes to prevent withdrawal of said hooks from said eyes.

2. A connector of the character described including a pair of rods one having lateral bends at one end to provide leg portions and a connecting bar portion forming an open side loop offset from the axis of said rod, an eye on one of said leg portions and having a terminal extending through said loop in contact with said bar portion, a hook on an end of the other rod and adapted to be projected through said eye and connected in hooked engagement with the other of said leg portions.

3. A connector of the character described including a pair of rods, one having lateral bends at one end to provide leg portions and a connecting bar portion forming an open side loop offset from the axis of said rod, an eye on one of said leg portions and having a terminal extending through said loop into contact with said bar portion, a hook on an end of the other rod and adapted to be projected through said eye and connected in hooked engagement with the other of said leg portions, said hook having a terminal projecting from said eye when the hook is engaged with said leg portion and adapted to be bent retractively over said eye to lock said rods together.

4. A connection for interconnecting and spacing a plurality of jetties to form a continuous line of said jetties, each of the jetties having a part to be engaged by said connection, said connection including a plurality of rods with a rod spanning the space between adjacent jetties and having ends overlapping at said jetty parts, at least one of said overlapping ends of each rod being provided with lateral bends forming lateral bar portions and an interconnecting bar portion cooperating with the lateral bar portions in providing an open side loop for containing said jetty part, and said lateral bar portions providing stops engaging opposite sides of the jetty part to prevent relative movement of said jetty part in the longitudinal direction of said rods when said overlapping ends are connected together, said other of the overlapping ends having a portion extending across the open side of said loop and carrying means for interconnecting the rods on opposite sides of said jetty part for retaining the jetty part within said loop portion.

5. A connection for interconnecting and spacing a plurality of jetties to form a continuous line of said jetties, each of the jetties having a part to be engaged by said connection, said connection including a plurality of rods with a rod spanning the space between adjacent jetties and having ends overlapping at said jetty parts, said overlapping ends of each rod being provided with lateral bends forming lateral bar portions and an interconnecting bar portion cooperating with the lateral bar portions in providing open side loops for containing said jetty part, said lateral bar portions providing stops engaging opposite sides of the jetty part to prevent relative movement of said jetty part in the longitudinal direction of said rods when said overlapping ends are connected together, and links on the respective rods at the sides of the jetty part and over terminals of said rods and for clamping the end of one rod to the end of the other rod on opposite sides of said jetty part, said terminals of the rods being bent reversely to draw the links into contact with the lateral portions and retain the links in rod connecting position.

6. A connection for interconnecting and spacing a plurality of jetties to form a continuous line of said jetties, each of the jetties having a part to be engaged by the connection, said connection including a plurality of rods with a rod spanning the space between adjacent jetties and having ends overlapping at said jetty parts, one of said overlapping ends of one rod having bends to provide lateral leg portions and an interconnecting bar portion forming an open side loop offset from the axis of said one rod and to contain said jetty part therein with the leg portions forming stops engaging opposite sides of the jetty part to prevent relative movement of the jetty part in the longitudinal direction of said rods when the overlapping ends of the rods are connected together, an eye on one of said leg portions and having a terminal extending through said loop into contact with said bar portion, a hook on the overlapping end of the other rod and projecting through said eye and connected in hooked engagement with the other of said leg portions, and a terminal on said hook projecting from the eye and bent retractively over said eye to connect the rods together.

GEORGE W. REHFELD.

References Cited in the file of this patent

UNITED STATES PATENTS

| Number | Name | Date |
|---|---|---|
| 537,028 | Furrey et al. | Apr. 9, 1895 |
| 2,407,034 | Rehfeld | Sept. 3, 1946 |